(12) United States Patent
Rash et al.

(10) Patent No.: US 9,471,436 B2
(45) Date of Patent: Oct. 18, 2016

(54) USE OF INCREMENTAL CHECKPOINTS TO RESTORE USER DATA STREAM PROCESSES

(71) Applicant: Facebook, Inc., Menlo Park, CA (US)

(72) Inventors: Samuel Rash, Fremont, CA (US); Dhrubajyoti Borthakur, Sunnyvale, CA (US); Prakash Khemani, Saratoga, CA (US); Zheng Shao, Palo Alto, CA (US)

( * ) Notice: Subject to any disclaimer, the term of this patent is extended or adjusted under 35 U.S.C. 154(b) by 486 days.

(21) Appl. No.: 13/868,873

(22) Filed: Apr. 23, 2013

(65) Prior Publication Data

US 2014/0317448 A1     Oct. 23, 2014

(51) Int. Cl.
 G06F 11/14      (2006.01)
 G06Q 50/00      (2012.01)

(52) U.S. Cl.
 CPC ....... *G06F 11/1446* (2013.01); *G06F 11/1438* (2013.01); *G06F 11/1471* (2013.01); *G06F 11/1474* (2013.01); *G06Q 50/01* (2013.01)

(58) Field of Classification Search
 CPC .................................................. G06F 11/1471
 See application file for complete search history.

(56) References Cited

U.S. PATENT DOCUMENTS

| | | | | |
|---|---|---|---|---|
| 5,638,508 A * | 6/1997 | Kanai | ............... | G06F 11/1471 711/113 |
| 2002/0194525 A1* | 12/2002 | Mathiske et al. | ............... | 714/5 |
| 2003/0142131 A1* | 7/2003 | Dawe | ............... | G06F 3/0481 715/764 |
| 2005/0257090 A1* | 11/2005 | Santos et al. | ............... | 714/35 |
| 2007/0288530 A1* | 12/2007 | Romem | ............... | G06F 11/1471 |
| 2008/0270729 A1* | 10/2008 | Reddy | ............... | G06F 17/30598 711/170 |
| 2008/0307414 A1* | 12/2008 | Alpern | ............... | G06F 9/45558 718/1 |
| 2011/0191299 A1* | 8/2011 | Huynh Huu et al. | ........ | 707/646 |
| 2012/0084523 A1* | 4/2012 | Littlefield | ........... | G06F 11/1469 711/162 |
| 2012/0136835 A1* | 5/2012 | Kosuru | ............... | G06F 11/2094 707/654 |
| 2013/0024722 A1* | 1/2013 | Kotagiri | ............... | G06F 11/1004 714/6.1 |
| 2013/0097117 A1* | 4/2013 | Lasky | ................ | G06F 11/1451 707/624 |
| 2014/0114922 A1* | 4/2014 | Prahlad | ............... | G06F 11/1435 707/639 |
| 2014/0214770 A1* | 7/2014 | Kannan | ............... | G06F 11/1438 707/649 |

OTHER PUBLICATIONS

Shao, Zeng. Real-time Analytics at Facebook, Oct. 18, 2011. Facebook.*

(Continued)

*Primary Examiner* — Albert Decady
*Assistant Examiner* — Paul Contino
(74) *Attorney, Agent, or Firm* — Perkins Coie LLP

(57) ABSTRACT

A method and system on failure recovery in a storage system are disclosed. In the storage system, user data streams (e.g., log data) are collected by a scribeh system. The scribeh system may include a plurality of Calligraphus servers, HDFS and Zookeeper. The Calligraphus servers may shard the user data streams based on keys (e.g., category and bucket pairs) and stream the user data streams to Puma nodes. Sharded user data streams may be aggregated according to the keys in memory of a specific Puma node. Periodically, aggregated user data streams cached in memory of the specific Puma node, together with a Incremental checkpoint, are persisted to HBase. When a specific process on the specific Puma node fails, Ptail retrieves the Incremental checkpoint from HBase and then restores the specific process by requesting user data streams processed by the specific process from the scribeh system according to the Incremental checkpoint.

20 Claims, 6 Drawing Sheets

(56) References Cited

OTHER PUBLICATIONS

Brock. Apache Flume. The Apache Software Foundation. Sep. 26, 2012 [retrieved on Dec. 11, 2014]. Retrieved from the Internet: <URL: https://blogs.apache.org/flume/entry/apache_flume_filechannel>.*
Shvachko, Konstantin V. Flink, Ari. Coulter, Timothy. Automatic-Hot HA for HDFS NameNode. Nov. 11, 2011. ApacheCon North America 2011.*
DeVale, John. Checkpoint/Recovery. Feb. 4, 1999. Carnegie Mellon.*
Shao, Zheng. Shen, Guanghao. Data Freeway Large-scale Near Real-Time Log Collection System at Facebook. Sep. 4, 2010. Facebook.*
Borthakur, Dhruba et al. Apache Hadoop Goes Realtime at Facebook. Jun. 12-16, 2011. SIGMOD '11. pp. 1071-1080.*
Hoff, Todd. Facebook's New Realtime Analytics System: HBase to Process 20 Billion Events Per Day. High Scalability. Mar. 22, 2011 [retrieved on Dec. 11, 2014]. Retrieved from the Internet <http://highscalability.com/blog/2011/3/22/facebooks-new-realtime-analytics-system-hbase-to-process-20.html>.*
Kathuria, Vishal. Zookeeper at Facebook. Facebook. Jun. 12, 2011 [retrieved on Dec. 10, 2014]. Retrieved from the Internet: <https://cwiki.apache.org/confluence/download/attachments/26805288/Hadoop+Zookeeper+Summit.ppt>.*
Borthakur, Dhruba. Hadoop AvatarNode High Availability. Feb. 6, 2010 [retrieved on Dec. 11, 2014]. Retrieved from the Internet: <http://hadoopblog.blogspot.com/2010/02/hadoop-namenode-high-availability.html>.*
Borthakur, Dhruba. Realtime Hadoop usage at Facebook—Part 1. May 17, 2011 [retrieved on Dec. 10, 2014]. ]. Retrieved from the Internet: <http://hadoopblog.blogspot.com/2011/05/realtime-hadoop-usage-at-facebook-part.html>.*
White, Tom. HDFS Reliability. Jan. 12, 2008. Cloudera.*
Kreps, Jay. Narkhede, Neha. Rao, Jun. Kafka: a Distributed Messaging System for Log Processing. Jun. 12, 2011. NetDB'11. ACM.*
Mazor, Erez. Leader Election with Zookeeper. Jul. 9, 2011 [retrieved on Dec. 10, 2014]. Retrieved from the Internet: <http://techo-ecco.com/blog/leader-election-with-zookeeper/>.*
Salles, Marcos Vaz et al. An Evaluation of Checkpoint Recovery for Massively Multiplayer Online Games. Aug. 24-28, 2009. VLDB '09. VLDB Endowment, ACM. pp. 1258-1269.*
Mkyong. PostgreSQL Point-In-Time Recovery (Incremental Backup). Aug. 30, 2012 [retrieved on Dec. 10, 2014]. Retrieved from the Internet: <http://www.mkyong.com/database/postgresql-point-in-time-recovery-incremental-backup/>.*
Gray, Jonathan. Borthakur, Dhruba. Realtime Apache Hadoop at Facebook. Jun. 14, 2011. Facebook. SIGMOD.*
Zookeeper Recipes and Solutions. The Apache Software Foundation. Sep. 23, 2012 [retrieved on Dec. 10, 2014]. Retrieved from the Internet: <http://zookeeper.apache.org/doc/current/recipes.html#sc_leaderElection>.*
High Availability in Hadoop Ecosystem. 2011. MAPR. Version 1.*
Data Freeway: Scaling Out to Realtime. Yahoo Developer Network. Aug. 7, 2011 [retrieved on Oct. 30, 2015]. Retrieved from the Internet: <URL: https://www.youtube.com/watch?v=mlDG21OGYek>.*
Real-time Analytics at Facebook. Stanford University. Jun. 15, 2012 [retrieved on Oct. 30, 2015]. Retrieved from the Internet <URL: https://www.youtube.com/watch?v=4AqUPn40GsE>.*
Borthakur, Dhruba. Realtime Apache Hadoop at Facebook. Oct. 5, 2011.*
Why did Facebook develop Puma/pTail instead of using existing ones like Flume? Mar. 4, 2011 [retreived on Oct. 8, 2015]. Retrieved from the Internet <URL: https://www.quora.com/Why-did-Facebook-develop-Puma-pTail-instead-of-using-existing-ones-like-Flume>.*
Lars, George. HBase Architecture 101—Write-ahead-Log. Jan. 30, 2010 [retrieved on Oct. 8, 2015]. Retrieved from the Internet <URL: http://www.larsgeorge.com/2010/01/hbase-architecture-101-write-ahead-log.html>.*
Hwang, E., et al., "Data Freeway: Scaling Out to Realtime," Facebook, pp. 1-27. Jun. 30, 2011.

* cited by examiner

USE OF INCREMENTAL CHECKPOINTS TO RESTORE USER DATA STREAM PROCESSES

TECHNICAL FIELD

Various embodiments of the present disclosure generally relate to database management, and in particular to failure recovery in parallel data processing.

BACKGROUND

With the rapid increase and advances in digital consumer products (i.e., smart phones, digital cameras, PDAs), more digital information is being generated than ever before. According to International Data Corporation, the total amount of digital information in the world will come to 2.7 zettabytes by the end of 2012. Majority of newly generated digital information is data like log data, digital video, images and sound files. This puts up a huge challenge for existing database management systems to search, analyze and retrieve the information.

One solution is to implement parallel data collections and processes for performing database management and database operations. Multiple instances of data streams are created to divide work among many parallel processes or threads. Each instance processes some fraction of the overall data set in parallel.

SUMMARY

Embodiments of the present disclosure provide a variety of methods for recovering a failed process in a storage system. In some embodiments, the storage system may include a scribeh system, which comprises a plurality of Calligraphus servers, a Hadoop Distributed File System (HDFS) and a Zookeeper. The plurality of Calligraphus servers collect user data streams (e.g., log data) from web servers, backend servers, user scripts, browser-side data (i.e., data sent back via web servers), and mobile apps (e.g., iphone, android, etc). The collected user data streams may be sharded based on keys and streamed to HDFS and/or application nodes (e.g., Puma nodes). Sharded user data streams with the keys may be aggregated in memory of a particular application node. Periodically, aggregated user data streams on the particular application node are persisted to a storage (e.g., HBase and/or MySQL) in the storage system together with a Ptail checkpoint. When a specific process on the particular Puma node fails, Ptail retrieves the Ptail checkpoint from the storage. According to the information provided by the Ptail checkpoint, Ptail requests user data streams processed by the specific process from the scribeh system and restore the specific process in substantially real time.

In some embodiments, each Calligraphus server may include a writer and a router. The writer is configured to divide received user data streams into categories. Each category may be subdivided into buckets. The router is configured to look up a mapping between writers of the plurality of Calligraphus servers and categories of user data streams.

In some embodiments, loads on the Calligraphus servers are automatically balanced between servers. User data streams tagged with a specific category-bucket pair may be randomly distributed to any one of the plurality of Calligraphus servers.

In some embodiments, user data streams collected by Calligraphus servers are appended to files and persisted to separate directories in HDFS. Calligraphus servers determine which HDFS directories to write the user data streams and their paths. In some embodiments, output data streams from Calligraphus servers are grouped according to category-bucket pairs. In some embodiments, user data streams tagged with different category-bucket pairs do not share a single data stream. Each output data stream is persisted to its own directory in HDFS. In some embodiments, user data streams with certain category-bucket pairs are directed to a particular Calligraphus server so that output data streams from Calligraphus servers can be consolidated and persisted to fewer HDFS directories.

In some embodiments, an independent load management process is provided so that each Calligraphus server may independently inspect its own load and determine which subsets of its load to keep or shed.

In some embodiments, a canonical Zookeeper leader election is run to determine which writers of the plurality of Calligraphus servers will actually handle a particular category-bucket pair. When a specific leader dies, the successor is immediately notified of the change and can immediately take over the leader position. In some embodiments, the number of elections and load on each Calligraphus server can be dynamically controlled.

In some embodiment, a registration database is provided for users to add new categories into the mapping between writers of the Calligraphus servers and category-bucket pairs. During synchronization processes, newly registered categories can be pushed into Zookeeper.

In some embodiments, Ptail may determine which HDFS directory to read a specific user data stream, its path and which Puma node to send the specific user data stream. Ptail periodically generates a Ptail checkpoint to a particular Puma node. The Ptail checkpoint may include necessary information to allow any process and/or the Puma node to be quickly restored in substantially real time. The information may include the paths and HDFS directory information of user data streams on the particular Puma node. In some embodiments, the information may include IDs of Calligraphus servers and/or web/backend servers that handled and/or provided the user data streams on the particular Puma node.

In some embodiment, the particular Puma node determines the timing of flushing cached user data streams. When the particular Puma node triggers a flush of in-memory user data streams to HBase, the latest Ptail checkpoint on the particular Puma node may also be persisted to HBase. When a specific process on the particular Puma node fails, Ptail retrieves the latest Ptail checkpoint from HBase and restores the failed specific process based on the latest Ptail checkpoint.

In some embodiments, when a specific process on the particular Puma node fails, Puma retrieves the Ptail checkpoint from the storage. According to the information provided by the Ptail checkpoint, Puma requests user data streams processed by the specific process from the scribeh system and restore the specific process in substantially real time.

While multiple embodiments are disclosed, still other embodiments of the present disclosure will become apparent to those skilled in the art from the following detailed description, which shows and describes illustrative embodiments of the invention. As will be realized, the invention is capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
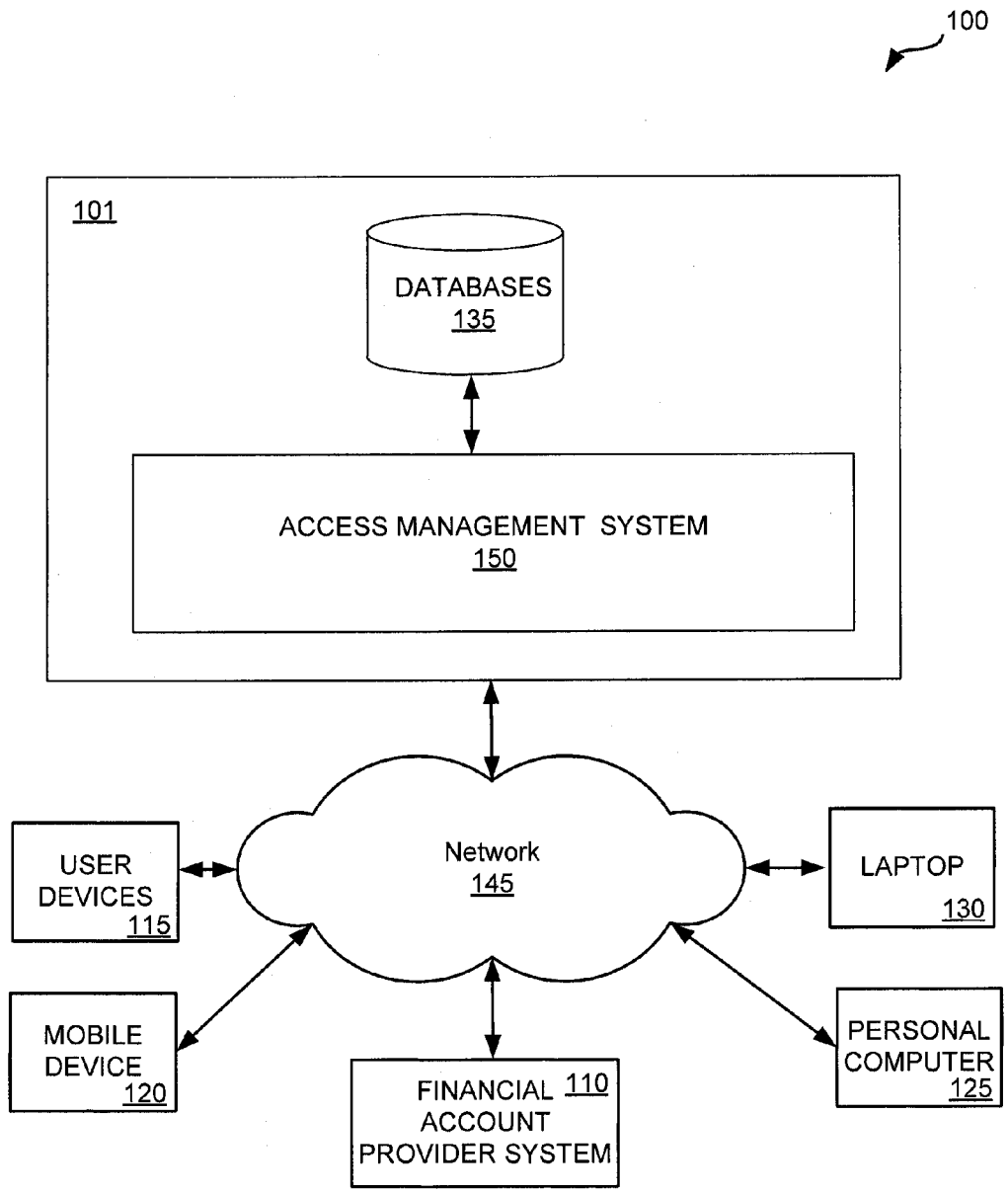
FIG. 1 illustrates an example of a system environment 100 for a social networking system 101 in which some embodiments of the present disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment. Such references mean at least one of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

However, existing storage systems typically operate independently and deal with parallel processes or threads within a single system to analyze streams of data from a signal site. It remains a challenge to effectively recover failed threads of data streams from a large number of sites.

Various embodiments of the present disclosure generally relate to failure recovery in storage systems. More specifically, various embodiments of the present disclosure relate to systems and methods for restoring a failed process on an application node of the storage systems. Traditionally, storage systems typically operate independently and deal with parallel processes or threads within a single system to analyze streams of data from a single server. In contrast, various embodiments of the present disclosure support parallel processes or threads from multiple servers. User data streams are sharded by keys and sent to Puma nodes. The keys can be different from user keys that the user data streams were originally sharded. A Ptail checkpoint is generated periodically for a specific Puma node and persisted to HBase together with cached user data streams on the specific Puma node. When a process on the specific Puma node fails, the Ptail checkpoint can be retrieved from HBase and used to restore the failed process in substantially real time.

While examples described herein refer to a social networking system, the descriptions should not be taken as limiting the scope of the present disclosure. Various alternatives, modifications, and equivalents will be apparent to those skilled in the art without varying from the spirit of the invention. For example, Ptail checkpoints may be implemented in any computing system organizing collected data streams. For another example, Ptail checkpoints may be implemented in any computing system having a database management system (DBMS). The DBMS may include HBase, MySQL, FoxPro, IBM DB2, Linter, Microsoft SQL Server, Oracle, PostgreSQL and SQLite etc.

FIG. 1 illustrates an example of a system environment 100 for a social networking system 101 in which some embodiments of the present disclosure may be utilized. The system environment 100 shown in FIG. 1 includes a social networking system 101, user devices 115, a financial account provider system 110 and a network 145. In other embodiments, the system environment 100 may include different and/or additional components than those shown by FIG. 1.

The social networking system 101, further described below in conjunction with FIG. 2, comprises one or more computing devices storing user profiles associated with users and/or other objects as well as connections between users and other users and/or objects, an access management system 150 and a plurality of databases, such as database/storage 135. Users can store data (i.e., photos, videos, messages, electronic documents, e-mails, records) and related analytics (i.e., usage analytics) in the social networking system 101. The data can be submitted through various user devices 115 and/or other devices to allow the data to be stored on database/storage 135. As illustrated in FIG. 1, these devices and tools may use network 145 to submit and retrieve information from the social networking system 101.

In some embodiments, users join the social networking system 101 and then add connections to other users or objects of the social networking system to which they desire to be connected. As further described below in conjunction with FIG. 1, users of the social networking system 101 may be individuals or entities such as businesses, organizations, universities and manufacturers. The social networking system 101 allows its users to interact with each other as well as with other objects maintained by the social networking system 101. In some embodiments, the social networking system 101 allows users to interact with third-party websites and the financial account provider 110.

Based on stored data about users, objects and connections between users and/or objects, the social networking system 101 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 101 modifies edges connecting the various nodes to reflect the interactions.

User devices 115 can be any computing device capable of receiving user input as well as transmitting and/or receiving data via the network 145. In one embodiment, user devices 115 are a conventional computer system, such as a desktop 125 or laptop computer 130. In another embodiment, user devices 115 may be mobile device 120 having computer functionality, such as a personal digital assistant (PDA), mobile telephone, smart-phone or similar device. User devices 115 are configured to communicate with access management system 150, and/or the financial account provider via the network 145. In one embodiment, a user device executes an application allowing a user of the user devices to interact with the access management system 150. For example, user devices 115 can execute a browser application to enable interaction between the user devices 115 and access management system 150 via the network 145. In another embodiment, user devices 115 interact with access management system 150 through an application programming interface (API) that runs on the native operating system of the user device 208, such as IOS® or ANDROID™.

User devices 115 can be configured to communicate via the network 145, which may comprise any combination of local area and/or wide area networks, using both wired and wireless communication systems. In one embodiment, the network 145 may include one or more networks of any type (i.e., wired and/or wireless). For example, the network 145 may include a wide area network (WAN), a local area network (LAN), an ad hoc network, the Internet, an intranet, a personal area network (PAN), a storage area network, a home area network, a campus area network, a backbone network, a metropolitan area network (MAN), an enterprise private network, a virtual private network, a virtual network, a cellular telephone network, a satellite network, a telephone network (i.e., a Public Switched Telephone Network (PSTN)), an internet-work or a combination of two or more of these. The network 145 may use technologies such as Ethernet as defined by IEEE 802.XX, 4G Long Term Evolution (LTE), 3rd Generation Partnership Project (3GPP), Global System for Mobile Communications (GSM), Enhanced Data Rates for GSM Evolution (EDGE), Universal Mobile Telecommunications System (UMTS), High Speed Packet Access (HSPA), Code Division Multiple Access (CDMA), Worldwide Interoperability for Microwave Access (WiMAX), International Mobile Telecommunications-Advanced (IMT-Advanced) or a combination of two or more of these.

The networking protocols used in the network 145 may include Transmission Control Protocol (TCP) and Internet Protocol (IP), Internetwork Packet Exchange/Sequenced Packet Exchange (IPX/SPX), User Datagram Protocol (UDP), Internet Control Message Protocol (ICMP), Hypertext Transfer Protocol (HTTP), Post Office Protocol (POP3), File Transfer Protocol (FTP), Internet Message Access Protocol (IMAP), X.25, AX.25, AppleTalk or a combination of two or more of these. Data exchanged over the network 145 may be represented using formats such as HTML, SGML-based HTML and/or XML-based HTML etc.

Figure 2:
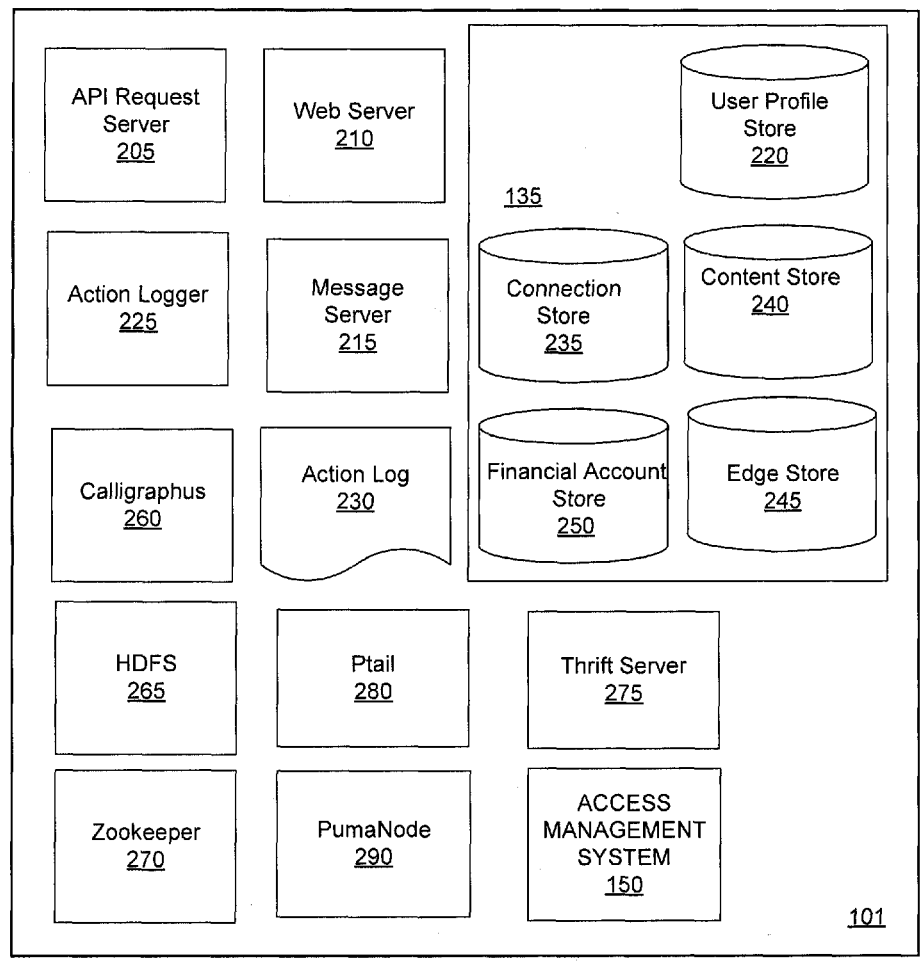
FIG. 2 is a block diagram of a system architecture of the social networking system 101 in accordance with one or more embodiments of the present disclosure.

FIG. 2 is a block diagram of system architecture of the social networking system 101, in accordance with one or more embodiments of the present disclosure. The social networking system 101 shown by FIG. 2 includes an access management system 150, an action logger 225, an API request server 205, a message server 215, a web server 210, an action log 230, a Ptail 280, a PumaNode 290 and a database/storage 135 (i.e., a user profile store 220, a content store 240, an edge store 245, a financial account store 250 and a connection store 235). In some embodiments, the social networking system 101 may include additional, fewer or different modules for various applications. Conventional components such as network interfaces, security mechanisms, load balancers, failover servers, management and network operations consoles, and the like are not shown so as to not obscure the details of the system architecture.

Each user of the social networking system 101 is associated with a user profile, which is stored in the user profile store 220. A user profile includes declarative information about the user that was explicitly shared by the user, and may also include profile information inferred by the social networking system 101. In one embodiment, a user profile includes multiple data fields, each data field describing one or more attributes of the corresponding user of the social networking system 101. The user profile information stored in user profile store 220 describes the users of the social networking system 104, including biographic, demographic and other types of descriptive information, such as work experience, educational history, gender, hobbies or preferences, location and the like. A user profile may also store other information provided by the user, for example, images, videos or other objects. In certain embodiments, images of users may be tagged with identification information on users of the social networking system 101 displayed in an image. A user profile in the user profile store 220 may also maintain references to actions by the corresponding user performed on content items in the content store 240 and stored in the edge store 245.

As further described below, a user profile may be associated with one or more financial accounts, allowing the user profile to include data retrieved from or derived from a financial account. A user may specify one or more privacy settings, which are stored in the user profile, that limit information from a financial account that the social networking system 101 is permitted to access. For example, a privacy setting limits the social networking system 101 to accessing the transaction history of the financial account and not the current account balance. As another example, a privacy setting limits the social networking system 101 to a subset of the transaction history of the financial account, allowing the social networking system 101 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 101. In one embodiment, information from the financial account is stored in the user profile store 220. In other embodiments, it may be stored in the financial account store 250, which is further described below.

The content store 240 stores content items associated with a user profile, such as images, videos or audio files. Content items from the content store 240 may be displayed when a user profile is viewed or when other content associated with the user profile is viewed. For example, displayed content items may show images or video associated with a user profile or show text describing a user's status. Additionally, other content items may facilitate user engagement by encouraging a user to expand his or her connections to other users, to invite new users to the system or to increase interaction with the social network system by displaying content related to users, objects, activities or functionalities of the social networking system 101. Examples of social networking content items include suggested connections or suggestions to perform other actions, media provided to, or maintained by, the social networking system 101 (e.g., pictures or videos), status messages or links posted by users to the social networking system, events, groups, pages (e.g., representing an organization or commercial entity), and any other content provided by, or accessible via, the social networking system.

The content store 240 also includes one or more pages associated with entities having user profiles in the user profile store 220. An entity is a non-individual user of the social networking system 101, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 240, allowing social networking system users to more easily interact with the vendor via the social networking system 101. A vendor identifier is associated with a vendor's page, allowing the social networking system 101 to identify the vendor and/or to retrieve additional information about the vendor from the user profile store 220, the action log 230 or from any other suitable source using the vendor identifier. In some embodiments, the content store 240 may also store one or more targeting criteria associated with stored objects and identifying one or more characteristics of a user to which the object is eligible to be presented.

The action logger 225 receives communications about user actions on and/or off the social networking system 101, populating the action log 230 with information about user actions. Such actions may include, for example, adding a connection to another user, sending a message to another user, uploading an image, reading a message from another user, viewing content associated with another user and attending an event posted by another user, among others. In some embodiments, the action logger 225 receives, subject to one or more privacy settings, transaction information from a financial account associated with a user and identifies user actions from the transaction information. For example, the action logger 225 retrieves vendor identifiers from the financial account's transaction history and identifies an object, such as a page, in the social networking system associated with the vendor identifier. This allows the action logger 225 to identify a user's purchases of products or services that are associated with a page, or another object, in the content store 240. In addition, a number of actions described in connection with other objects are directed at particular users, so these actions are associated with those users as well. These actions are stored in the action log 230.

The action log 230 may be used by the social networking system 220 to track user actions on the social networking system 101, as well as external website that communicate information to the social networking system 101. Users may interact with various objects on the social networking system 101, including commenting on posts, sharing links, checking-in to physical locations via a mobile device, accessing content items in a sequence or other interactions. Information describing these actions is stored in the action log 230. Additional examples of interactions with objects on the social networking system 101 included in the action log 230 include commenting on a photo album, communications between users, becoming a fan of a musician, adding an event to a calendar, joining a group, becoming a fan of a brand page, creating an event, authorizing an application, using an application and engaging in a transaction. Additionally, the action log 230 records a user's interactions with advertisements on the social networking system 101 as well as other applications operating on the social networking system 101. In some embodiments, data from the action log 230 is used to infer interests or preferences of the user, augmenting the interests included in the user profile and allowing a more complete understanding of user preferences.

The action log 230 may also store user actions taken on external websites and/or determined from a financial account associated with the user. For example, an e-commerce website that primarily sells sporting equipment at bargain prices may recognize a user of a social networking system 101 through social plug-ins that enable the e-commerce website to identify the user of the social networking system 101. Because users of the social networking system 101 are uniquely identifiable, e-commerce websites, such as this sporting equipment retailer, may use the information about these users as they visit their websites. The action log 230 records data about these users, including webpage viewing histories, advertisements that were engaged, purchases made and other patterns from shopping and buying. Actions identified by the action logger 225 from the transaction history of a financial account associated with the user allow the action log 230 to record further information about additional types of user actions. In some embodiments, content of the action log 230 may be stored in the database/storage 135.

In one embodiment, an edge store 245 stores the information describing connections between users and other objects on the social networking system 101 in edge objects. Some edges may be defined by users, allowing users to specify their relationships with other users. For example, users may generate edges with other users that parallel the users' real-life relationships, such as friends, co-workers, partners and so forth. Other edges are generated when users interact with objects in the social networking system 101, such as expressing interest in a page on the social networking system, sharing a link with other users of the social networking system, and commenting on posts made by other users of the social networking system. The edge store 245 stores edge objects that include information about the edge, such as affinity scores for objects, interests and other users. Affinity scores may be computed by the social networking system 101 over time to approximate a user's affinity for an object, interest and other users in the social networking system 101 based on the actions performed by the user. Multiple interactions between a user and a specific object may be stored in one edge object in the edge store 245, in one embodiment. In some embodiments, connections between users may be stored in the user profile store 220, or the user profile store 220 may access the edge store 245 to determine connections between users.

Ptail 280 is an internal tool in the social networking system 101 to aggregate user data streams from a scribeh system. The user data streams may be collected from web servers, backend servers, user scripts and cron applications, etc. Periodically, Ptail 280 provides and caches Ptail checkpoints in memory of application nodes (e.g., Puma nodes). On a specific application node, the latest Ptail checkpoint is periodically persisted to HBase together with the aggregated user data streams. When a process on the specific application node fails, the latest Ptail checkpoint can be retrieved from HBase and used to restore the failed process.

Puma node 290 is a near-real-time analytic engine, which is designed for analytics and insight report (i.e., demographical breakdowns, website analysis, Clicks, Likes, Shares, Comments and Impressions) and can be used for processing and computing time-series data. In some embodiments, Puma node 290 may batch data for a predetermined period of time (e.g., 1.5 seconds, 20 seconds or 5 minutes) before forwarding them for either further processing or store them in HBase. In some embodiments, Puma node 290 may start a new batch when last flush is completed to avoid lock contention issues.

In one embodiment, the database/storage 135 may be defined as a computer system for serving data to users. The database/storage 135 may be a computer system as described in FIG. 6. In some embodiments, the database/storage 135 may include, for example, an HBase, a MySQL, a Hadoop machine, a file server machine or a computer connected to multiple storage devices.

The database/storage 135 may contain any type of computer writable and readable storage media. By way of example, the storage media may include a volatile memory (i.e., a random access memory (RAM), etc.), a non-volatile memory (i.e., a flash memory, a read-only memory (ROM), etc.), a hard disk, an optical disc, a floppy disk, a magnetic tape, a solid-state drive (SSD), a secure digital (SD) card, or any suitable computer-readable storage medium or a combination of two or more of these.

Figure 3:
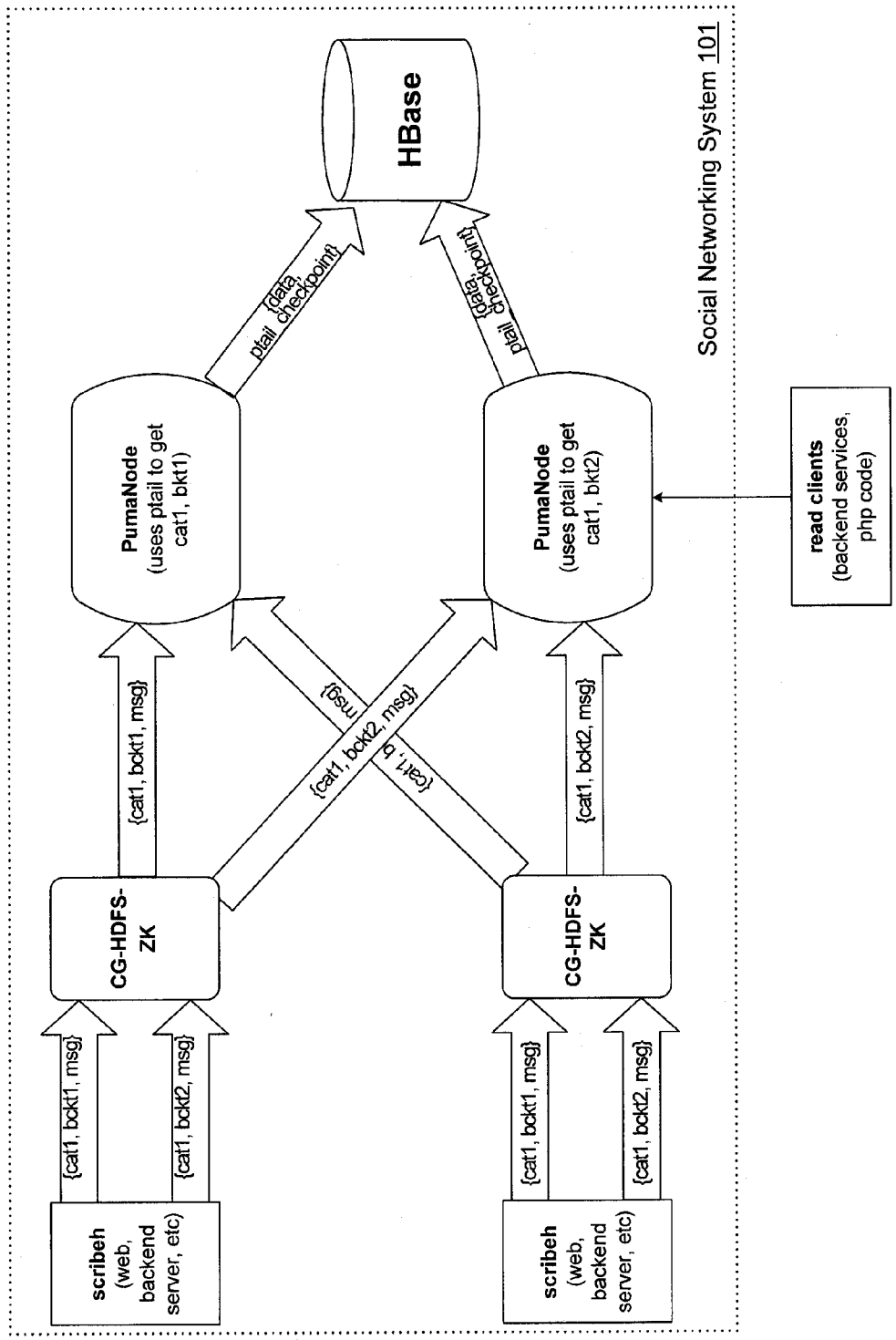
FIG. 3 illustrates a block diagram of user data flow in a scribeh system of the social networking system 101, in accordance with various embodiments of the present disclosure.

FIG. 3 illustrates a block diagram of data flow in a scribeh system of the social networking system 101, in accordance with various embodiments of the present disclosure. The system 101 includes a scribeh system to collect data streams from users. The scribeh system is a stream partitioning system that provides user data streams with periodic checkpoints (i.e., tokens) that can be used to resume partitions at a specific point. In some embodiments, the scribeh system includes a thrift application programming interface (API), which supports a variety of computing languages being used. Users may send user data streams using PHP, Python, Pearl, Ruby, compiled C or C++ binaries, Java, or other suitable computer languages.

The scribeh system may include a plurality of Calligraphus servers, HDFS and Zookeeper. In one embodiment, the scribeh system may collect user data streams from a web server, a backend server, a user script and/or a cron job etc. In another embodiment, a user may submit the user data directly to the scribeh system. Each specific user data stream may be tagged with a particular category, e.g., Category 1 (cat1), Category 2 (cat2), etc. In some embodiments, each category may be subdivided into multiple buckets. User data streams may be sharded based on keys (e.g., category-bucket pairs).

In some embodiments, when a downstream system of the scribeh system is down, the scribeh system may be configured to buffer user data streams locally until the downstream system becomes available.

In some embodiments, the plurality of Calligraphus servers collect user data streams from web and backend servers and then persist the incoming user data streams to HDFS. The user data streams may be randomly distributed among the plurality of Calligraphus servers. Each category of user data stream is distributed to any specific Calligraphus server. In some embodiments, the load of the plurality of Calligraphus servers is automatically balanced between servers.

In some embodiments, a specific output data stream from a Calligraphus server may be appended to files and persisted to one directory in the HDFS. When a downstream system requests the specific output data stream from the HDFS, the specific output data stream may be provided in substantially a data stream format. In some embodiments, user data from different categories do not share a single user data stream and are written to separate user data streams. Different Calligraphus servers may not share the same user data stream. Calligraphus servers take independent user data streams sharded in categories and write each user data stream to its own directory in HDFS. In some embodiments, Calligraphus servers are configured to determine which directories to write the user data streams and the paths.

In some embodiments, directories in HDFS may be replicated one or more times and stored in separate partitions or storage devices in the database/storage. In some implementations, directories in HDFS may be stored in a RAID array.

In some embodiments, each of the plurality of Calligraphus servers may include two logical components, a router and a writer. The writer divides received user data streams into categories and subsets of categories (i.e., buckets). The router is configured to look up a mapping between writers of the plurality of Calligraphus servers and categories of user data streams.

In some embodiments, the plurality of Calligraphus servers may direct a specific user data stream to a particular writer according to the mapping between writers and categories. By consolidating user data streams tagged with the same category into a single user data stream, the total number of HDFS directories may be minimized.

Zookeeper may be used as a platform for task allocation to provide a distributive map for routers of the plurality of Calligraphus servers. In some embodiments, the distributive map includes information in the form of paths. The paths may be defined as the relation between writers and categories. In some embodiments, a specific category may be subdivided into buckets if data streams of the specific category are too large to be handled by any given writer of the plurality of Calligraphus servers.

Under each path, a canonical Zookeeper leader election can be run to determine the owners of a particular category-bucket pair and which writer of the plurality of Calligraphus servers will actually handle the particular category-bucket pair. When a specific leader or a specific candidate dies, the successor immediately gets notified of the change and can take over right away. In some embodiments, Bootstrap hosts may randomly join these elections so that any of the plurality of Calligraphus servers may serve a load in a normal distribution among the Calligraphus servers.

In some embodiments, an independent load management process may be provided for the Calligraphus servers to allow each Calligraphus server to inspect its own load and determine subsets of its load. Each Calligraphus server may independently determine which subsets of its load to keep or shed without consulting with any other nodes.

In some embodiments, the entire mapping or important aspect of hierarchy between writers and categories/buckets may be cached into memory of each of the plurality of Calligraphus servers. Cached mapping information in memory of each Calligraphus server can reduce network I/O between Zookeeper and each Calligraphus server and minimize the network I/O delay resulted from communications between Zookeeper and Calligraphus servers.

The scribeh system may also include a registration database to continually add new categories into the mapping between writers and category-bucket pairs. The registration database is configured to allow users to register new categories and, during a synchronization process, push newly registered categories into Zookeeper.

In some embodiments, when a user registers a new category, the registration database may ask the user to specify how much network capacity the user will use for the new category. The registration database assigns a network capacity limit for the user and monitors network usage of the user. When the network usage of the user exceeds the limit, the registration database may alert the user.

In some embodiments, the number of elections and the number of data streams from the Calligraphus servers can be dynamically controlled. Whenever there is a throughput change with a specific category in the mapping, the number of buckets allocated under the specific category can be automatically modified.

The scribeh system is coupled to Ptail. Ptail gets user data streams with specific keys (e.g., category-bucket pairs) from HDFS and/or Calligraphus servers and stream the user data streams to a near-real-time analytic engine (e.g., Puma). An application node of the near-real-time analytic engine may cache the real-time mapping between writers and category-bucket pairs. In some embodiments, Ptail is configured to determine which HDFS directory to read a specific user data stream, what the path is and which application node to send the specific user data stream.

Examples of processes on an application node may include real time total impressions, clicks, actions, conversions per domain/ad/etc., real time demographics breakdowns of metrics (e.g., impressions of 25-29 mail users), real time uniques (e.g., unique users per ad for today till now, 7 days till now, or days till now), daily active users on mobile, and/or real time page insights which is page and post stats for page admins (e.g., uniques and counts).

Figure 4:
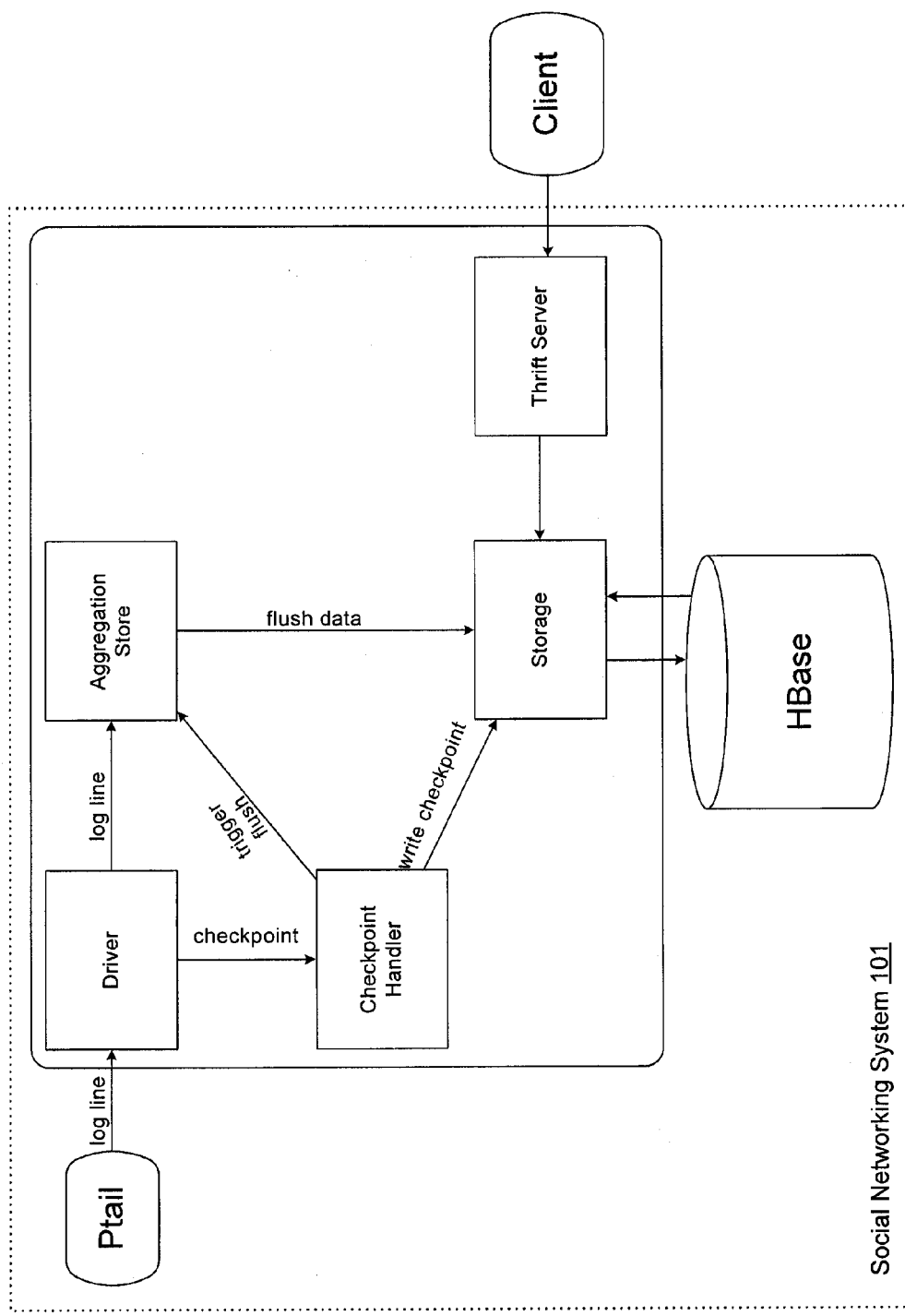
FIG. 4 illustrates a block diagram of an application node in a data stream processing system of the social networking system 101, in accordance with various embodiments of the present disclosure.

Ptail may generate log lines and pass off the log lines to a particular Puma node, as illustrated in FIG. 4. A driver in the particular Puma node passes the log lines to a pool of working threads that parse the log lines, process them and send them to appropriate memory for in-memory aggregation. Periodically (e.g., every 20 seconds), Ptail generates a Ptail checkpoint to a Ptail checkpoint handler in the particular Puma node. The Ptail checkpoint may contain necessary information to allow any process of the Puma node or the entire Puma node to be quickly restored up to the time when the checkpoint is generated. The information may include the paths and specific HDFS directories of user data streams on the particular Puma node. In some embodiments, the information may include IDs of servers that originally provided the user data streams on the particular Puma node. A series of checkpoints issued by the Ptail in sequence may represent a partial ordering of user data streams.

In one embodiment, the checkpoint handler determines the timing of flushing the in-memory data cached at the particular Puma node. Within a flush interval, which is how often in-memory data are persisted, multiple Ptail checkpoints may be received from Ptail. The checkpoint handler may ignore the arrival of any Ptail checkpoint. When the checkpoint handler triggers a flush of the in-memory data from the aggregation store to a database/storage (e.g., an HBase and a MySQL), the latest Ptail checkpoint received by the checkpoint handler may also be persisted to the database/storage.

As illustrated in FIG. 4, if a client wants to read a specific data from the HBase, the client can send a request to a thrift server of the Puma node. The thrift server stands proxy to request a storage interface to provide the specific data. The storage interface can read the specific data from the HBase based on the request.

In some embodiments, backups of the database/storage (e.g., an HBase and a MySQL) may be managed by a database operation engine. Data stored in the database/storage can be replicated as distributed "rsync" jobs. In some instances, the replication of the database/storage can be used both as a backup data and a hot standby data for cases requiring Benchmark Control Point (BCP).

When a specific process on a particular application node fails, Ptail requests a copy of the latest Ptail checkpoint persisted on the database/storage (e.g., an HBase and a MySQL). Based on the latest Ptail checkpoint, a new process can be generated to quickly restore the specific process up to the point when the latest Ptail checkpoint was generated.

In some embodiments, Ptail may request user data streams handled by the failed specific process from HDFS directories according to the paths and specific HDFS directory information in the latest Ptail checkpoint.

In some embodiments, the Ptail checkpoint may contain IDs of Calligraphus servers that supplied the user data streams to the particular application node. Ptail may rebuild a new process by requesting user data streams directly from memories of Calligraphus servers according to the server IDs and/or the paths of the user data streams. If the user data streams are not cached in memory of the Calligraphus servers, the Calligraphus servers may act as proxy to request the data from the corresponding web/backend servers that originally submitted the data.

In some embodiments, Ptail may request persisted in-memory data from the database according to the latest Ptail checkpoint and restore the specific process based on the retrieved data from the database.

In some embodiments, a read API may be provided on the particular application node to read the latest Ptail checkpoint and/or the persisted in-memory data from the database. In some embodiments, database (e.g., HBase) queries and storage format are optimized and evolve over time. Persisted data in the database may be read using a fixed interface.

Figure 5:
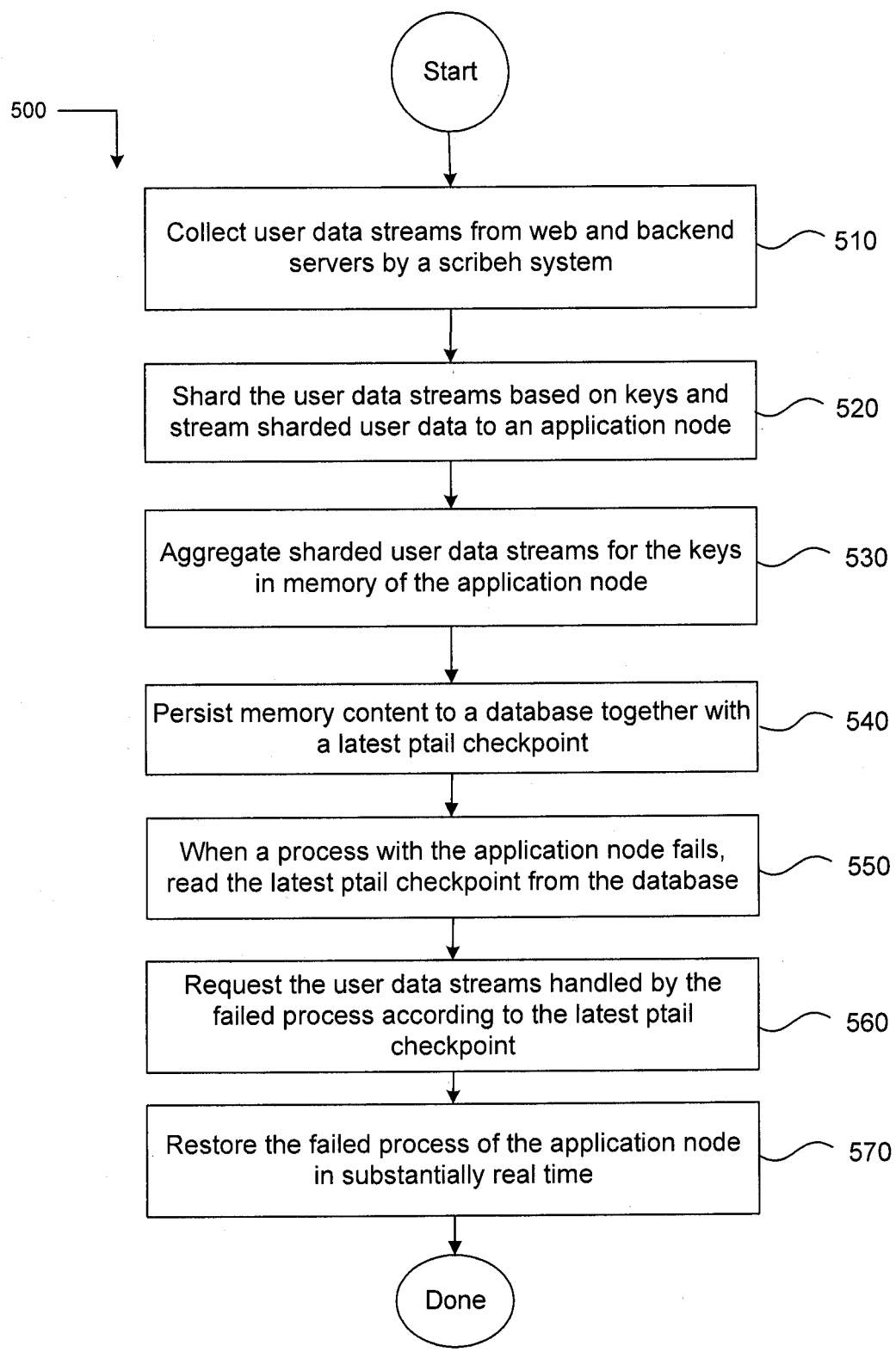
FIG. 5 illustrates a flow chart showing a set of operations 500 that may be used for failure recovery via incremental checkpoints in a social networking system with which some embodiments of the present disclosure may be utilized.

FIG. 5 illustrates a flow chart showing a set of operations 500 that may be used for failure recovery via incremental checkpoints in a social networking system with which some embodiments of the present disclosure may be utilized. The operations illustrated in FIG. 5 may be performed in various embodiments by Puma Node 290, HDFS 265, Calligraphus 260 and database/storage 135 associated with Ptail 280. At step 510, user data streams from web and backend servers are collected by a plurality of Calligraphus servers in a scribeh system. Each user data stream may be tagged with a specific category. In some embodiments, the specific category may be subdivided into one or more buckets. In some embodiments, the load between the Calligraphus servers is automatically balanced. Each category of user data streams may be randomly distributed to any of the Calligraphus servers, which may independently determine its load to keep.

In some embodiments, user data streams collected by Calligraphus servers are appended to files and persisted to separate directories in HDFS. Calligraphus servers are configured to determine what HDFS clusters to write the user data streams and their paths. In some embodiments, output data streams from Calligraphus servers are separated according to category-bucket pairs. User data from different category-bucket pairs do not share a single data stream. Calligraphus servers take each output data stream with a specific category-bucket pair and persist the output data stream to its own category in HDFS. In some embodiments, the output data streams can be consolidated and persisted to fewer HDFS directories by directing user data streams with certain category-bucket pairs to a particular Calligraphus server.

At step 520, user data streams are sharded based on keys (e.g., category-bucket pairs) and then streamed to an application node (e.g., a Puma node). Sharded user data streams for a specific key may be sent to appropriate memory for in-memory aggregation, at step 530. In some embodiments, Ptail generates a Ptail checkpoint to the application node. The checkpoint may include information for Ptail to rebuild a failed process of the application node and/or the entire application node. The information may include specific HDFS directories, the paths, and/or identifications of servers provided sharded user data streams on the application node.

At step 540, the application node periodically triggers a flush of aggregated memory content to a database/storage. The application node may receive one or more checkpoints from Ptail within a flush interval. Only the latest Ptail checkpoint is persisted to the database together with the other aggregated memory content.

When a process with the application node fails, at step 550, the latest Ptail checkpoint can be read from the database/storage. At step 560, Ptail requests the same set of user data streams processed by the failed process according to the latest Ptail checkpoint. The same set of user data streams may be requested from HDFS based on the keys and HDFS directory information included in the Ptail checkpoint. In some embodiments, the same set of user data streams may be requested from memory of the corresponding Calligraphus servers and/or the corresponding web/backend servers according to the Ptail checkpoint. At step 570, the failed process of the application node can be restored based on the Ptail checkpoint and the retrieved user data streams. In some embodiments, the failed process can be restored based on the latest Ptail checkpoint and aggregated user data streams persisted on the storage (e.g., HBase and MySQL).

While the method 500 of FIG. 5 is described in the context of a single database/storage, the present disclosure contemplates a plurality of synchronous databases/storages. The plurality of synchronous databases/storages can be located at a single location or a variety of locations.

Figure 6:
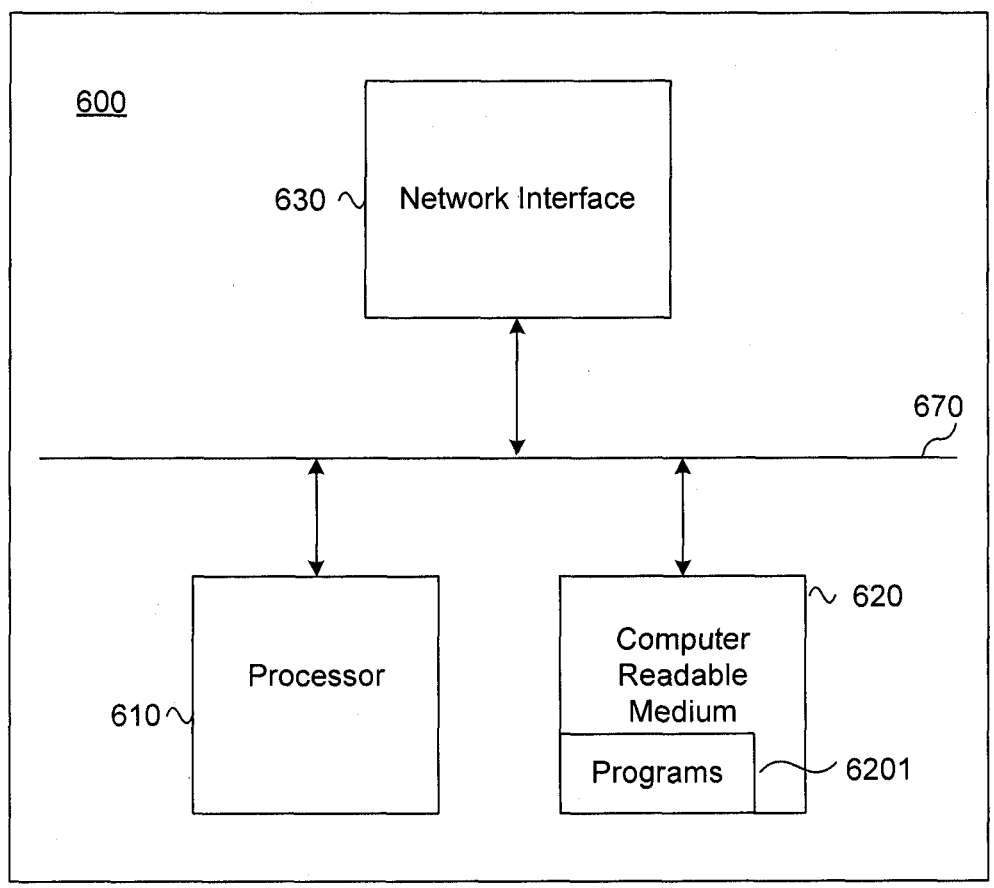
FIG. 6 illustrates an example of a computer system with which some embodiments of the present disclosure may be utilized.

FIG. 6 illustrates a diagram of a computer system 600, in accordance with yet another embodiment of the present disclosure. The computer system 600 may include at least one processor 610, one or more network interface 630 and one or more computer readable medium 620, all interconnected via one or more bus 670. In FIG. 6, various components are omitted for illustrative simplicity. The computer system 600 is intended to illustrate a device on which any other components described in this specification (i.e., any of the components depicted in FIGS. 1-4) can be implemented.

The computer system 600 may take a variety of physical forms. By way of examples, the computer system 600 may be a desktop computer, a laptop computer, a personal digital assistant (PDA), a portable computer, a tablet PC, a wearable computer, an interactive kiosk, a mobile phone, a server, a mainframe computer, a mesh-connected computer, a single-board computer (SBC) (i.e., a BeagleBoard, a PC-on-a-stick, a Cubieboard, a CuBox, a Gooseberry, a Hawkboard, a Mbed, a OmapZoom, a Origenboard, a Pandaboard, a Pandora, a Rascal, a Raspberry Pi, a SheevaPlug, a Trim-Slice, etc.), an embedded computer system, or a combination of two or more of these. Where appropriate, the computer system 600 may include one or more computer systems 600, be unitary or distributed, span multiple locations, span multiple machines, or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The computer system 600 preferably may include an operating system such as, but not limited to, Windows®, Linux® or Unix®. The operating system may include a file management system, which organizes and keeps track of files. In some embodiments, a separate file management system may be provided. The separate file management can interact smoothly with the operating system and provide enhanced and/or more features, such as improved backup procedures and/or stricter file protection.

The at least one processor 610 may be any suitable processor. The type of the at least one processor 610 may comprise one or more from a group comprising a central processing unit (CPU), a microprocessor, a graphics processing unit (GPU), a physics processing unit (PPU), a digital signal processor, a network processor, a front end processor, a data processor, a word processor and an audio processor.

The one or more bus 670 is configured to couple components of the computer system 600 to each other. As an example and not by way of limitation, the one or more bus 670 may include a graphics bus (i.e., an Accelerated Graphics Port (AGP)), an Enhanced Industry Standard Architecture (EISA) bus, a front-side bus (FSB), a HyperTransport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Although the present disclosure describes and illustrates a particular bus, this disclosure contemplates any suitable bus or interconnects.

The one or more network interface 630 may include one or more of a modem or network interface. It will be appreciated that a modem or network interface can be considered to be part of the computer system 600. The interface can include an analog modem, an asymmetric digital subscribe line (ADSL) modem, a cable modem, a doubleway satellite modem, a power line modem, a token ring interface, a Cambridge ring interface, a satellite transmission interface or any suitable interface for coupling a computer system to other computer systems. The interface can include one or more input and/or output devices. The I/O devices can include, by way of example but not limitation, a keyboard, a mouse or other pointing device, disk drives, printers, a scanner, a touch screen, a Tablet screen, and other input and/or output devices, including a display device. The display device can include, by way of example but not limitation, a cathode ray tube (CRT) display, a liquid crystal display (LCD), a 3-D display, or some other applicable known or convenient display device. For simplicity, it is assumed that controllers of any devices not depicted in the example of FIG. 6 reside in the interface.

The computer readable medium 620 may include any medium device that is accessible by the processor 610. As an example and not by way of limitation, the computer readable medium 620 may include volatile memory (i.e., a random access memory (RAM), a dynamic RAM (DRAM), and/or a static RAM (SRAM)) and non-volatile memory (i.e., a flash memory, a read-only memory (ROM), a programmable ROM (PROM), an erasable programmable ROM (EPROM), and/or an electrically erasable programmable ROM (EEPROM)). When appropriate, the volatile memory and/or non-volatile memory may be single-ported or multiple-ported memory. This disclosure contemplates any suitable memory. In some embodiments, the computer readable medium 620 may include a semiconductor-based or other integrated circuit (IC) (i.e., a field-programmable gate array (FPGA) or an application-specific IC (ASIC)), a hard disk, an HDD, a hybrid hard drive (HHD), an optical disc (i.e., a CD-ROM, or a digital versatile disk (DVD)), an optical disc drive (ODD), a magneto-optical disc, a magneto-optical drive, a floppy disk, a floppy disk drive (FDD), a magnetic tape, a holographic storage medium, a solid-state drive (SSD), a secure digital (SD) card, a SD drive, or another suitable computer-readable storage medium or a combination of two or more of these, where appropriate. The computer readable medium 620 may be volatile, non-volatile, or a combination of volatile and non-volatile, where appropriate.

Programs 6201 may be stored on the one or more computer readable media 620. As an example, but not by way of limitation, the computer system 600 may load the programs 6201 to an appropriate location on the one or more compute readable media 620 for execution. The programs 6201, when executed, may cause the computer system 600 to perform one or more operations or one or more methods described or illustrated herein. In some implementations, the operations may include, but are not limited to, collecting user data streams from a plurality of web and backend servers; wherein the user data streams are collected by a scribeh system; sharding the user data streams based on keys, the keys including a plurality of categories; wherein each category is subdivided into one or more buckets; streaming the sharded user data to an application node; aggregating sharded user data streams in memory of the application node according to the keys; periodically persisting memory content and a latest Ptail checkpoint on the application node to a storage; when a specific process of the application node fails, retrieving the Ptail checkpoint from the storage; requesting user data streams handled by the failed specific process from the scribeh system according to the Ptail checkpoint; and restoring the specific process on the application node in substantially real time based on the requested user data streams and the latest Ptail checkpoint.

As will be appreciated by one of ordinary skill in the art, the operations or methods may be instantiated locally (i.e., on one local computer system) and may be distributed across remote computer systems. For example, it may be determined that the available computing power of the local computer system is insufficient or that additional computing power is needed, and may offload certain aspects of the operations to the cloud.

While the computer-readable medium is shown in an embodiment to be a single medium, the term "computer-readable medium" should be taken to include single medium or multiple media (e.g., a centralized or distributed database/storage, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

Further examples of computer-readable medium, machine-readable storage medium, machine-readable medium or computer-readable (storage) medium include but are not limited to recordable type medium such as volatile and non-volatile memory devices, floppy and other removable disks, hard disk drives, optical disks, Digital Versatile Disks, among others and transmission type medium such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing provide illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but is not limited to." As used herein, the terms "connected," "coupled," or any variant thereof, means any connection or coupling, either direct or indirect, between two or more elements; the coupling of connection between the elements can be physical, logical or a combination thereof. Additionally, the words "herein," "above," "below" and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word, any of the items in the list, all of the items in the list and any combination of the items in the list.

The above detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined and/or modified to provide alternative or sub combinations. Each of these processes or blocks may be implemented in a variety of different ways.

Also, while processes or blocks are at times shown as being performed in series, these processes or blocks may instead be performed in parallel or may be performed at different times. Further, any specific numbers noted herein are only examples—alternative implementations may employ differing values or ranges.

The teaching of the disclosure provided herein can be applied to other systems and not necessarily to the system described above. Any patents and applications and other references noted above, including any that may be listed in accompanying filing papers, are incorporated herein by reference. Aspects of the disclosure can be modified if necessary to employ the systems, functions and concepts of the various references described above to provide yet further embodiments of the disclosure.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally or logically, are understood to be implemented by computer programs or equivalent electrical circuits, microcode or the like. Furthermore, it has also proven convenient at times to refer to these arrangements of operations as modules, without loss of generality. The described operations and their associated modules may be embodied in software, firmware, hardware or any combinations thereof.

Any of the steps, operations or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of medium suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

What is claimed is:

1. A method, comprising:
  collecting user data streams from a plurality of different sources; wherein the user data streams are collected by a data stream processing system;
  sharding the user data streams based on keys, the keys including a plurality of categories; wherein each category is subdivided into one or more buckets;
 streaming the sharded user data streams to an application node;
  aggregating the sharded user data streams in memory of the application node according to the keys;
  periodically persisting memory content and a most current incremental checkpoint on the application node to a storage; and
  in an event a specific process of the application node fails, generating a first process for restoring the specific process, wherein the first process is configured to:
    retrieve the most current incremental checkpoint from the storage,
    request user data streams handled by the failed specific process from the data stream processing system according to the most current incremental checkpoint, wherein the requested user data streams are obtained from any of (a) a file storage system based on directory information in the most current incremental checkpoint, (b) one or more of multiple servers based on server identification (ID) in the most current incremental checkpoint or (c) the storage to which in-memory data of the application node is persisted, the in-memory data including user data streams handled by the failed specific process, and
    restore the specific process on the application node in real time based on the requested user data streams and the most current incremental checkpoint and the aggregated sharded user data streams.

2. The method of claim 1, wherein the plurality of different sources include any combination of web servers, backend servers, user scripts, browser-side data and mobile apps; and wherein the data stream processing system comprises a plurality of Calligraphus servers, HDFS and Zookeeper.

3. The method of claim 2, wherein each of the plurality of Calligraphus servers includes a router and a writer, the writer configured to shard received user data streams according to the keys, the router configured to look up a mapping between writers of the plurality of Calligraphus servers and the keys.

4. The method of claim 3, further comprising: randomly distributing the user data streams to the plurality of Calligraphus servers; wherein loads on the plurality of servers are automatically balanced.

5. The method of claim 3, further comprising: persisting user data streams with different keys to separate directories in HDFS.

6. The method of claim 5, further comprising: directing user data streams with certain keys to a particular writer according to the mapping; and persisting consolidated user data streams to HDFS.

7. The method of claim 3, further comprising: running a canonical Zookeeper leader election to determine leader writers to handle user data streams with a specific key; and, when a specific leader dies, automatically replacing the specific leader with a successor writer.

8. The method of claim 7, wherein the incremental checkpoint includes the HDFS directory information of user data streams on the application node.

9. The method of claim 8, wherein the incremental checkpoint includes identifications of Calligraphus servers and/or the plurality of different sources that have provided the user data streams on the application node.

10. A storage system, comprising:
a computer system; and
an application program instantiated on the computer system, wherein the application provides computer-generated output;
wherein the computer system is configured to:
collect user data streams from a plurality of different sources; wherein the user data streams are collected by a data stream processing system;
shard the user data streams based on keys, the keys including a plurality of categories; wherein each category is subdivided into one or more buckets;
stream the sharded user data streams to an application node;
aggregate the sharded user data streams in memory of the application node according to the keys;
periodically persist memory content and a most current incremental checkpoint on the application node to a storage; and
in an event a specific process of the application node fails, generate a first process for restoring the specific process, wherein the first process is configured to:
retrieve the most current incremental checkpoint from the storage,
request user data streams handled by the failed specific process from the data stream processing system according to the most current incremental checkpoint, wherein the requested user data streams are obtained from any of (a) a file storage system based on directory information in the most current incremental checkpoint, (b) one or more of multiple servers based on server identification (ID) in the most current incremental checkpoint or (c) the storage to which in-memory data of the application node is persisted, the in-memory data including user data streams handled by the failed specific process, and
restore the specific process on the application node in real time based on the requested user data streams and the most current incremental checkpoint and the aggregated sharded user data streams.

11. The storage system as recited in claim 10, wherein the plurality of different sources include any combination of web servers, backend servers, user scripts, browser-side data and mobile apps; and wherein the data stream processing system comprises a plurality of Calligraphus servers, HDFS and Zookeeper.

12. The storage system as recited in claim 11, wherein each of the plurality of Calligraphus servers includes a router and a writer, the writer configured to shard received user data streams according to the keys, the router configured to look up a mapping between writers of the plurality of Calligraphus servers and the keys.

13. The storage system as recited in claim 12, wherein the computer system is configured to randomly distribute the user data streams to the plurality of Calligraphus servers; wherein loads on the plurality of servers are automatically balanced.

14. The storage system as recited in claim 12, wherein the computer system is configured to persist user data streams with different keys to separate directories in HDFS.

15. The storage system as recited in claim 14, wherein the computer system is configured to: direct user data streams with certain keys to a particular writer according to the mapping; and persist consolidated user data streams to HDFS.

16. The storage system as recited in claim 12, wherein the computer system is configured to: run a canonical Zookeeper leader election to determine leader writers to handle user data streams with a specific key; and, when a specific leader dies, automatically replace the specific leader with a successor writer.

17. The storage system as recited in claim 12, wherein the incremental checkpoint includes the HDFS directory information of user data streams on the application node.

18. The storage system as recited in claim 17, wherein the incremental checkpoint includes identifications of Calligraphus servers and/or the plurality of different sources that have provided the user data streams on the application node.

19. A method comprising:
collecting user data streams from a plurality of different sources; wherein the user data streams are collected by a data stream processing system, the data stream processing system comprising a plurality of Calligraphus servers, HDFS and Zookeeper;
sharding the user data streams based on keys, the keys including a plurality of category-bucket pairs;
streaming the sharded user data streams to an application node;
aggregating the sharded user data streams in memory of the application node according to the keys;
periodically persisting memory content and a most current incremental checkpoint on the application node to a storage; and
in an event a specific process of the application node fails, generating a first process for restoring the specific process, wherein the first process is configured to:

retrieve the most current incremental checkpoint from the storage, request user data streams handled by the failed specific process from (a) the plurality of Calligraphus servers based on server identification (ID) in the most current incremental checkpoint, (b) HDFS based on directory information in the most current incremental checkpoint, and/or the storage to which in-memory data of the application node is persisted, the in-memory data including user data streams handled by the failed specific process, and restore the specific process on the application node in real time based on the requested user data streams and the most current incremental checkpoint and the aggregated sharded user data streams.

20. The method of claim 19, wherein each of the plurality of Calligraphus servers includes a router and a writer, the writer configured to shard received user data streams according to the keys, the router configured to look up a mapping between writers of the plurality of Calligraphus servers and the keys.

* * * * *